(12) United States Patent
Singhal (10) Patent No.: US 9,207,775 B2
(45) Date of Patent: Dec. 8, 2015

(54) SYSTEMS AND METHODS FOR POSITIONING KEYS IN LIMITED KEY SPACE OF HANDHELD MOBILE WIRELESS DEVICES

(76) Inventor: Tara Chand Singhal, Torrance, CA (US)

( * ) Notice: Subject to any disclaimer, the term of this patent is extended or adjusted under 35 U.S.C. 154(b) by 791 days.

(21) Appl. No.: 12/931,795

(22) Filed: Feb. 10, 2011

(65) Prior Publication Data

US 2012/0207527 A1 Aug. 16, 2012

(51) Int. Cl.
| | |
|---|---|
| *B41J 5/10* | (2006.01) |
| *G06F 3/02* | (2006.01) |
| *G06F 1/16* | (2006.01) |
| *H04M 1/23* | (2006.01) |
| *G06F 3/0488* | (2013.01) |

(52) U.S. Cl.
CPC ............ *G06F 3/0219* (2013.01); *G06F 1/1626* (2013.01); *G06F 3/0216* (2013.01); *G06F 3/04886* (2013.01); *H04M 1/23* (2013.01)

(58) Field of Classification Search
CPC ... G06F 1/1626; G06F 3/0219; G06F 3/0216; G06F 3/04886; H04M 1/23
USPC .......... 400/486, 489; D14/247, 455, 391, 399
See application file for complete search history.

(56) References Cited

U.S. PATENT DOCUMENTS

| | | | | |
|---|---|---|---|---|
| 6,445,380 | B1 * | 9/2002 | Klein ............................. | 345/168 |
| 6,851,877 | B1 * | 2/2005 | Liebhold ....................... | 400/486 |
| 7,104,711 | B2 * | 9/2006 | Kurriss .......................... | 400/486 |
| 7,137,769 | B2 * | 11/2006 | Komatsu et al. .......... | 414/222.01 |
| 7,186,041 | B2 * | 3/2007 | Harley .......................... | 400/486 |
| 8,033,744 | B2 * | 10/2011 | Baker ............................ | 400/486 |
| 8,297,861 | B2 * | 10/2012 | Wang et al. ................... | 400/489 |
| 2005/0244208 | A1 * | 11/2005 | Suess ............................ | 400/486 |
| 2006/0228149 | A1 * | 10/2006 | Harley .......................... | 400/486 |
| 2007/0147933 | A1 * | 6/2007 | Zhang ........................... | 400/486 |

FOREIGN PATENT DOCUMENTS

WO 2008043232 * 4/2008 ................ G06F 3/02

* cited by examiner

*Primary Examiner* — Blake A Tankersley
*Assistant Examiner* — Marissa Ferguson Samreth
(74) *Attorney, Agent, or Firm* — Steve Roder, Esq.

(57) ABSTRACT

A method for positioning keys in a limited key space in handheld computing and communication devices for efficient finger operation, has the steps of, (i) selecting a set of keys from a full set of keys, where the selected set is useful for use in small handheld devices based on their mode of use and operation, (ii) partitioning the selected keys in two groups of more-used and less-used keys, (iii) positioning the more-used keys in a top center area of the keypad space and the less-used keys in a remainder key space including a bottom, a left, and a right area of the key space, and (iv) adjusting the layout of the keys in the key space based on the size and the orientation of the key space with an correspondingly adjusted key size.

14 Claims, 11 Drawing Sheets

Structured Key Space (SKS) 10
for finger use in small handheld devices

Prior Art

PRIOR ART

Figure 2A

PRIOR ART

Structured Key Space 10
for finger use in small handheld devices

Fifty-two keys in key space arrangement in
nine distinct functional groups

Group 1 – vowels + H → 6 keys

Group 2 – first row of more-used consonants → 8 keys

Group 2 – second row of more-used consonants → 7 keys

Group 3 – less used consonants keys → 5 keys

Group 4 – Del, Space, RET (LF) keys → 3 keys

Group 5 – cursor arrow keys → 4 keys

Group 6 – first set of numerals → 5 keys

Group 7 – second set of numerals → 5 keys

Group 8 – punctuation marks → 6 keys

Group 9 – special keys → 3 keys

A system for placing keys in a key space 10 in small handheld communication and computing devices

Function A 40 that first selects those keys of the full key set that is appropriate for finger and thumb operation in limited key spaces.

Function B 42 that groups these selected groups into two groups of more-used keys and less-used keys.

Function C 44 that groups the more-used keys into different groups based on their use pattern in the small devices. These groups are vowels, more-used consonants, and special keys of space and delete.

Function D 46 that groups the less-used keys into different groups based on their use pattern in the small devices. These groups are less-used consonants, function keys, punctuation keys and numerals and arrow keys.

Function E 48 that divides the key space into four spaces that of top-center, bottom and left and right.

Function F 50 that positions the different groups into these four key spaces that enables efficient finger operation of the keys.

Figure 7

At step 60, selecting a limited set of keys from the full set of computer keyboard keys, that are appropriate for small handheld computing and communication devices for finger/thumb operation.

At step 62, grouping the selected keys into two groups of more-used and less-used keys.

At step 64, grouping the more-used key group into the groups of (I) vowels, (ii) more used consonants and (iii) special keys.

At step 66, grouping the less-used keys into groups of (I) less-used consonants, (ii) numerals, (iii) punctuation, (iv) special functions.

At step 68, partitioning the key space into four spaces of, (i) top-center area (ii) bottom space, (iii) left space, and (iv) right space.

At step 70, positioning the groups of vowels, more-used consonants, and special keys in the top-center area.

At step 72, positioning the groups of, less-used consonants and punctuation in the bottom space.

At step 74, positioning the groups of, numerals, and special functions in the left and right spaces.

At step 76, dividing the numerals and the special functions into two groups, a left and a right group for positioning in the left and right spaces.

At step 78, positioning the left and right groups into the left and right spaces.

At step 80, spacing the key sizes to the device key space size and device orientation.

Figure 8

SYSTEMS AND METHODS FOR POSITIONING KEYS IN LIMITED KEY SPACE OF HANDHELD MOBILE WIRELESS DEVICES

CROSS REFERENCE

None

FIELD OF THE INVENTION

Systems and methods for positioning keys in a limited keypad space in small handheld computing and communication devices for efficient finger and thumb operation are described:

BACKGROUND

Handheld computing and communication devices such as smart phones have small screen sizes and small physical space relative to personal computers for positioning the key space. They are also used by the masses.

Figure 1A:
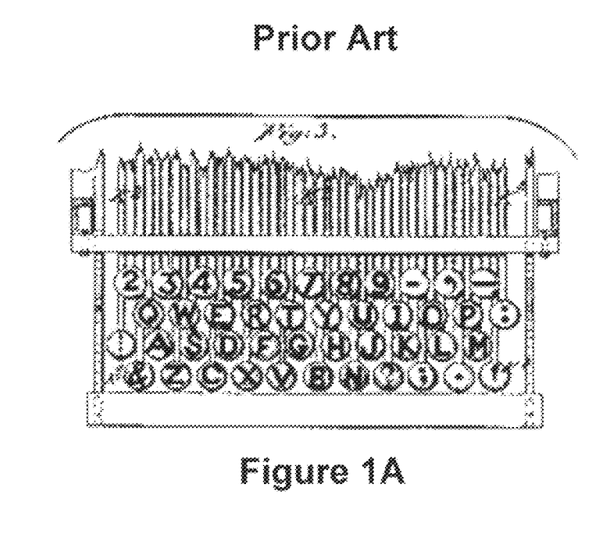
FIG. 1A-B are prior art QWERTY and non-QWERTY keyboards used in old type writers.

QWERTY keyboard was developed a century or more ago, in 1800s for use in Remington mechanical typewriters for two handed type writer operation that relied on all ten fingers including the thumb, where the thumb was used for pressing the long space bar at the bottom of the keyboard. See Prior art FIG. 1A In the decades following the original Remington, many alternative keyboards came and went. Then, in 1932, with funds from the Carnegie Foundation, Professor August Dvorak, of Washington State University, set out to develop the ultimate typewriter keyboard once and for all.

Figure 1B:
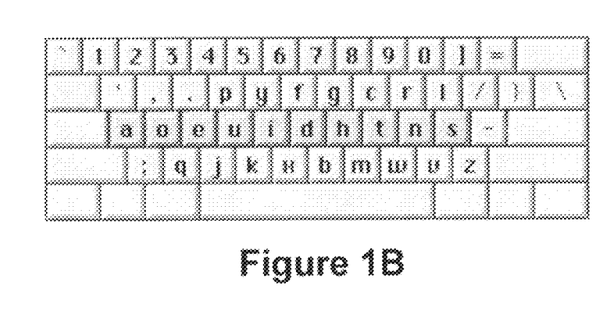

Dvorak went beyond Blickensderfer in arranging his letters according to frequency. Dvorak's home row uses all five vowels and the five most common consonants: AOEUIDHTNS. With the vowels on one side and consonants on the other, a rough typing rhythm would be established as each hand would tend to alternate. See prior art FIG. 1B. FIG. 1C is prior art frequency of usage of alphabets.

With the Dvorak keyboard, a typist can type about 400 of the English language's most common words without ever leaving the home row. The comparable figure on QWERTY is 100. The home row letters on Dvorak do a total of 70% of the work. On QWERTY they do only 32%.

The Dvorak keyboard sounds very good. However, a keyboard need to do more than just "sound" good, and unfortunately, Dvorak has failed to prove itself superior to QWERTY. It appears that many of the studies used to test the effectiveness of Dvorak were flawed. Many were conducted by the good professor himself, creating a conflict of interest question, since he had a financial interest in the venture. A U.S. General Services Administration study of 1953 appears to have been more objective. It found that it really didn't matter what keyboard you used. Good typists type fast, bad typists don't.

It's not surprising, then, that Dvorak has failed to take hold. No one wants to take the time and trouble to learn a new keyboard, especially if it isn't convincingly superior to the old. A few computer programs and special-order daisy wheels are available to transform modern typewriters or word processors to the Dvorak keyboard, but the demand for these products is small. After all, expert typists can do nearly 100 words a minute with QWERTY. Word processors increase that speed significantly. The gains that Dvorak claims to offer aren't really needed.

The first computer terminals such as the Teletype were typewriters that could produce and be controlled by various computer codes. These used the QWERTY layouts, and added keys such as escape (ESC) which had special meanings to computers. Later keyboards added function keys and arrow keys. Since the standardization of PC-compatible computers and Windows after the 1980s, most full-sized computer keyboards have followed this standard. This layout has a separate numeric keypad for data entry at the right, 12 function keys across the top, and a cursor section to the right and center with keys for Insert, Delete, Home, End, Page Up, and Page Down with cursor arrows in an inverted-T shape.

The QWERTY keyboard was developed for typing while not looking at keys themselves. The same QWERTY keyboard has been used in the computers and has also been used for small devices in their very small key spaces relative to the computers. Small handheld devices are used differently. First they are used with a finger and are used for typing short texts for use in SMS and e-mail. They are not used for writing page level texts as are the QWERTY keyboard in computers.

The industry solutions have been to copy QWERTY design as best as possible in the limited space without understanding the different nature of these devices for data entry and different mode of key use in these devices.

The Nokia E55 uses a half QWERTY keyboard layout. A half QWERTY keyboard is a combination of an alpha-numeric keypad and a QWERTY keypad, designed for Mobile phones. In a half QWERTY keyboard, two characters share the same key, which reduces the number of keys and increases the surface area of each key, useful for mobile phones that have little space for keys. It means that 'Q' and 'W' will share the same key and the user has to press the key once to type 'Q' and two times to type 'W'.

Also designed for mobile devices, the displaced QWERTY layout allows for the increase of button area by over 40% while keeping the same candy bar form factor. Entering, spacing and deleting are handled by gestures over the text area, reducing the keyboard's screen footprint. The layout is essentially a rearrangement of keys on the right half of the keyboard under those on the left and, as such, should present a gentler learning curve to touch typists. It was first seen on the iPhone application "LittlePad".

Figure 2A:
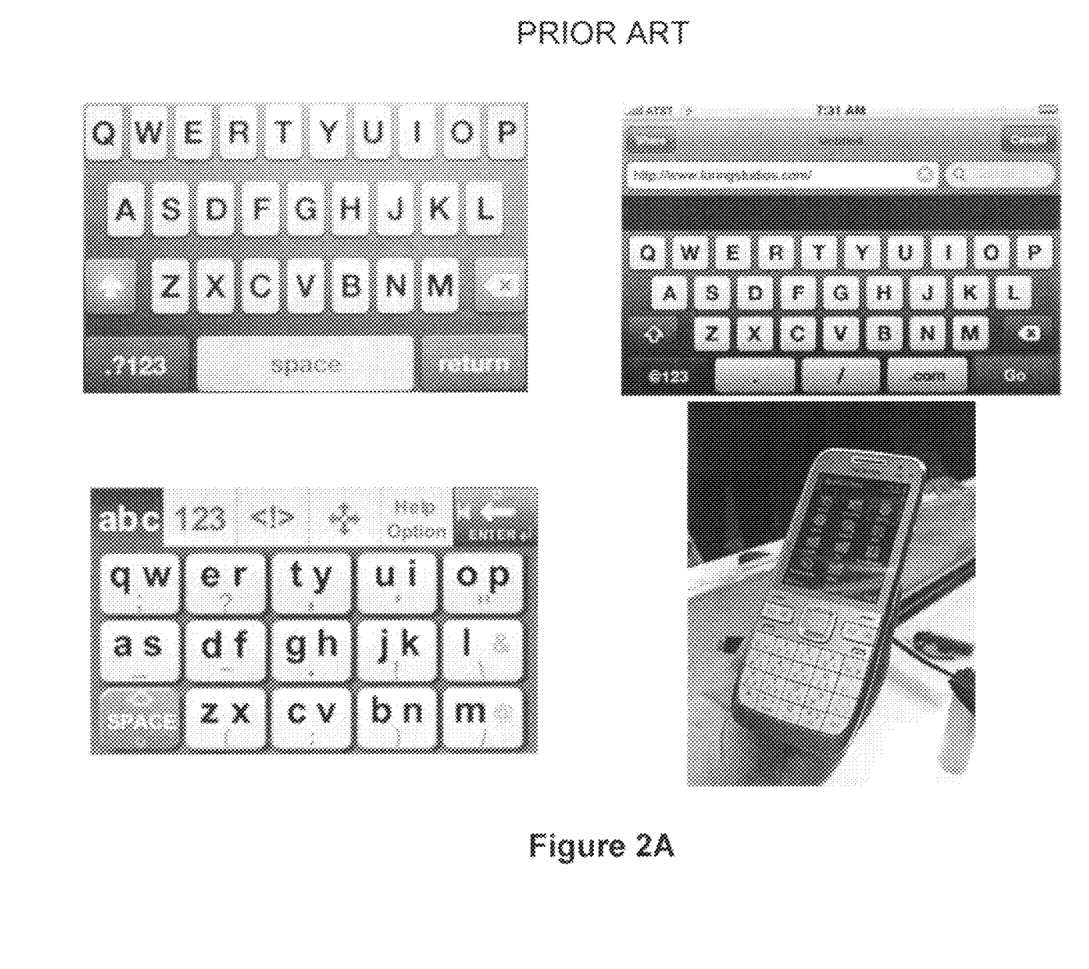
FIG. 2A-B are prior art adaptation of QWERTY on small handheld devices such as smart phones.
Figure 2B:
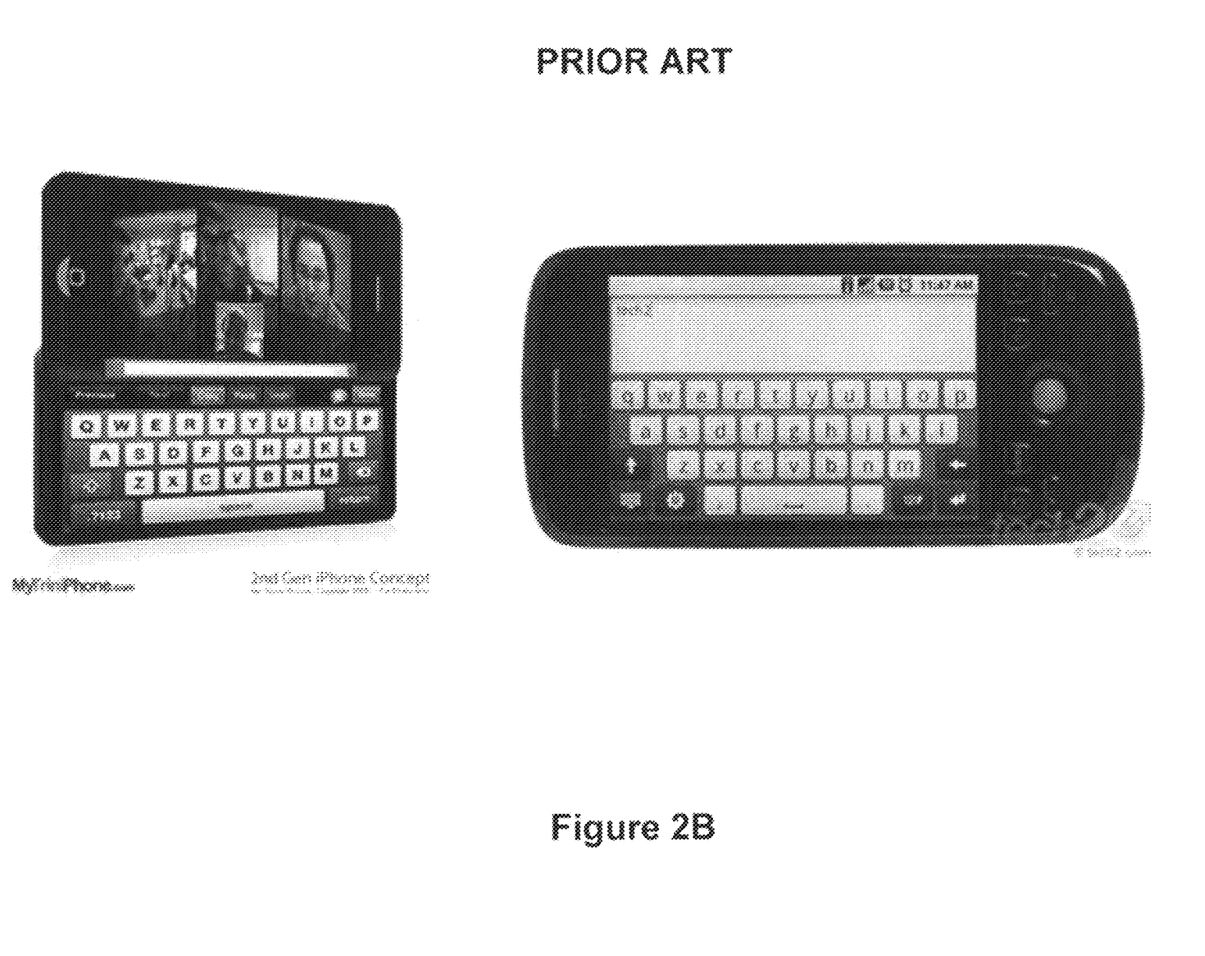

FIGS. 2A-2B show small devices with QWERTY keypads illustrating the fact that the QWERTY has been universally adopted for small devices. However different key arrangements than QWERTY are required for small handheld computing and communication devices for efficient finger operation. Hence it is the objective of the embodiments herein to be able to provide different formats for positioning keys in the key space for small handheld electronic devices that it is believed would be more efficient for finger use in small devices. It is further the objective to provide for an improved key positioning for efficient and intuitive finger operation for data entry.

SUMMARY

Systems and methods for positioning keys in the limited key space of handheld computing and communication devices are described. In a typewriter and computer keyboards, the full size keyboards commonly known as QWERTY are for two handed operation while the device is placed on a table. Further, there was no need to look at the keyboard itself for experienced typists, as the user looks at the display screen or the paper being typed on.

In contrast, in a limited key space of small handheld devices, a single finger or a single thumb operation, where the user is using a single finger or sometimes a thumb while holding the device in the hand is looking at the key space to find the desired key. It is believed that when a person looks at an area of space to find an object such as specific key, the person is focusing on a specific area and not the entire key space. In the QWERTY keyboards the keys are positioned for two hand operation as well as the old style mechanical operation where the mechanical arms interfered with each other and the QWERTY arrangement avoided that problem.

The industry has adopted the same QWERTY keypad arrangement for small handheld devices as described in the background section with the help of prior art FIGS. 2A-B. Therefore, a new key space arrangement for keys specifically for the hand held devices is required. Keeping that in mind a new key space layout is described that is designed for a finger/thumb operation and also provides a structured space for easily finding the desired key. This new key space is called as structured key space (SKS).

The creation of a structured key space for small devices requires an analysis and study of mode of operation of these devices. Based on this analysis, these small devices are used for limited typing operation such as for text message and for replying to e-mail etc. These devices are not used for typing full page manuscript or long texts as are the computing devices with full size keyboards. Based on this analysis, it is also clear that the index finger or the thumbs are preferred modes of pressing the keys and not the entire hand.

To achieve the structured key space as described above, systems and methods are described. Under the first part of the analysis, it is decided which of the full set of keys in a QWERTY, are pertinent and relevant for this use and operation for their small space and the purpose.

The first part of the structure analysis is to select those keys from the full key set that are relevant for the mode of use of these small devices. Based on this analysis, fifty-two such keys are chosen from the full set. As a simplified illustration which keys were not chosen, there are six bracket keys and many punctuation keys which are not relevant for the small device operation and use.

After a set of keys are selected, the structured key space (SKS) the design has three main parts of the design process. In the first part of the design process, the keys themselves are structured into different groups based on their purpose and use pattern. In the second part of the design process, the key space itself is structured into multiple spaces. In the third part of the design process, the key groups are positioned in these multiple key spaces.

In the first part of the design, the selected keys are grouped into hierarchical functional groups. The first hierarchy is of two groups of, more-used keys and less-used keys. For the second level of hierarchy, each of these functional groups of keys is further divided into the next set of hierarchical groups. The more-used group has the groups of vowels, more-used consonants and special keys of Space and Delete. The less-used group has the groups of numerals, punctuation, less-used consonants, cursor control, and special keys. These groups may be further sub-divided in yet another lower level of hierarchical groups of keys. Ultimately there are eight such functional groups of keys.

In the second part of the design is to partition the key space itself. The key space is partitioned into four spaces. These spaces are top-center, bottom and left and right spaces.

Then the third part of the design is to position the eight functional groups of keys into these four spaces. The judgments required for creating the eight groups, creating the four spaces and positioning the eight groups in the four spaces requires intuitive knowledge of the keys and how they would be used in the small handheld devices. The SKS layout also avoid creating key groups that would be hidden as it is the case in prior art and still fit all the desired set of selected fifty-two keys in the limited key space.

Some aspects of the SKS may be customizable. As an illustration, the left and right spaces areas keys may be swapped with each other. Further certain less-used and most used consonants may be swapped as well based on customer preference These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 1C is prior art frequency of usage of alphabets.

DESCRIPTION

Introduction

Systems and methods for placing keys in a limited key space in small handheld communication and computing devices to facilitate their efficient operation with a finger or a thumb, is described with the help of FIGS. 3 to 8.

In the embodiments described herein, a structured design methodology is used to determine placing of the keys in the limited key space in contrast to prior art-copying the QWERTY keyboard layout, as described in the prior art FIGS. 2A-2B, onto theses devices.

Figure 3A:
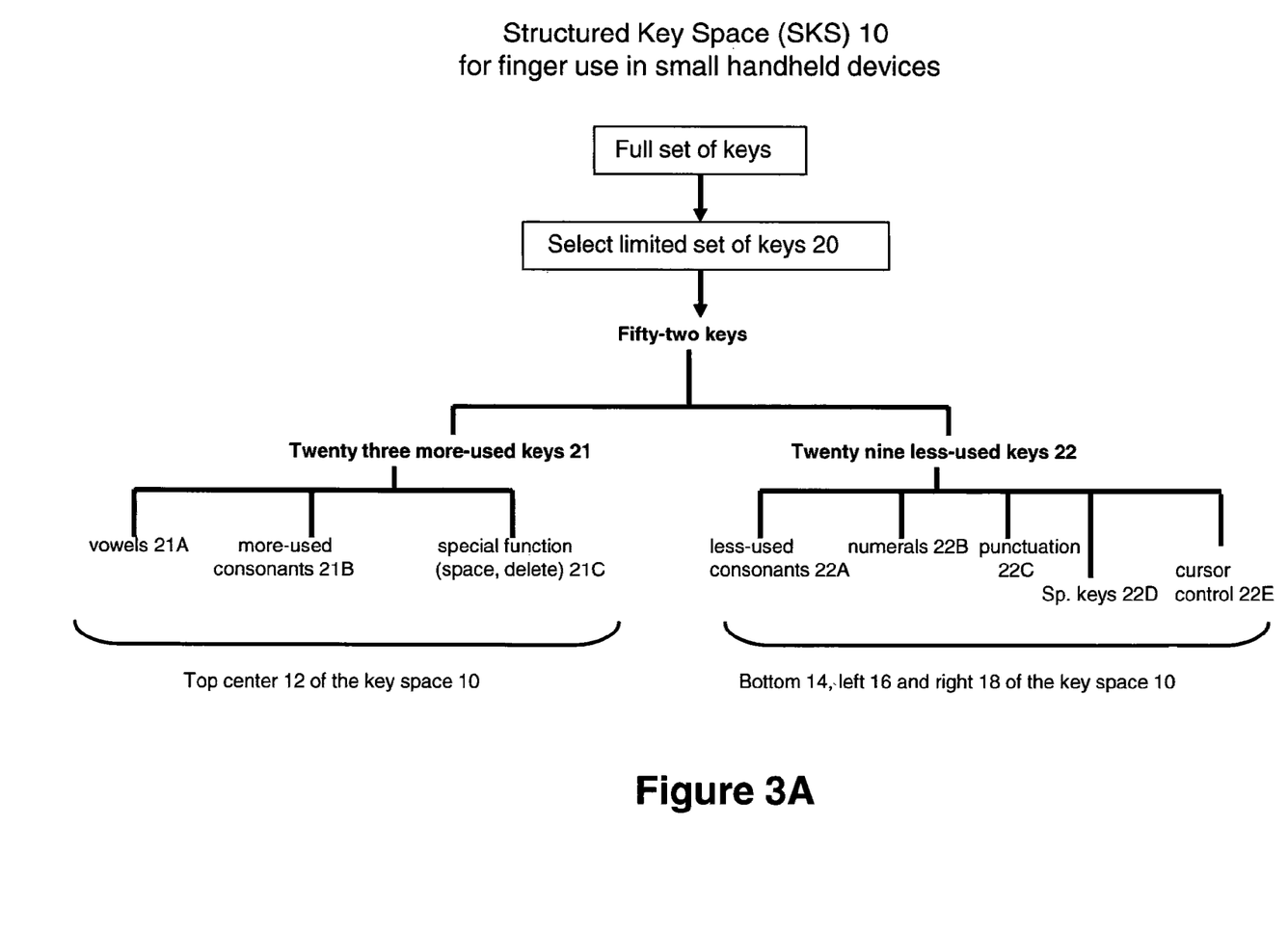
FIG. 3A-3B are a block diagram of the structure of functional groups of keys and a block diagram of the key space and the positioning of the keys in the key space according to an embodiment herein.
Figure 3B:
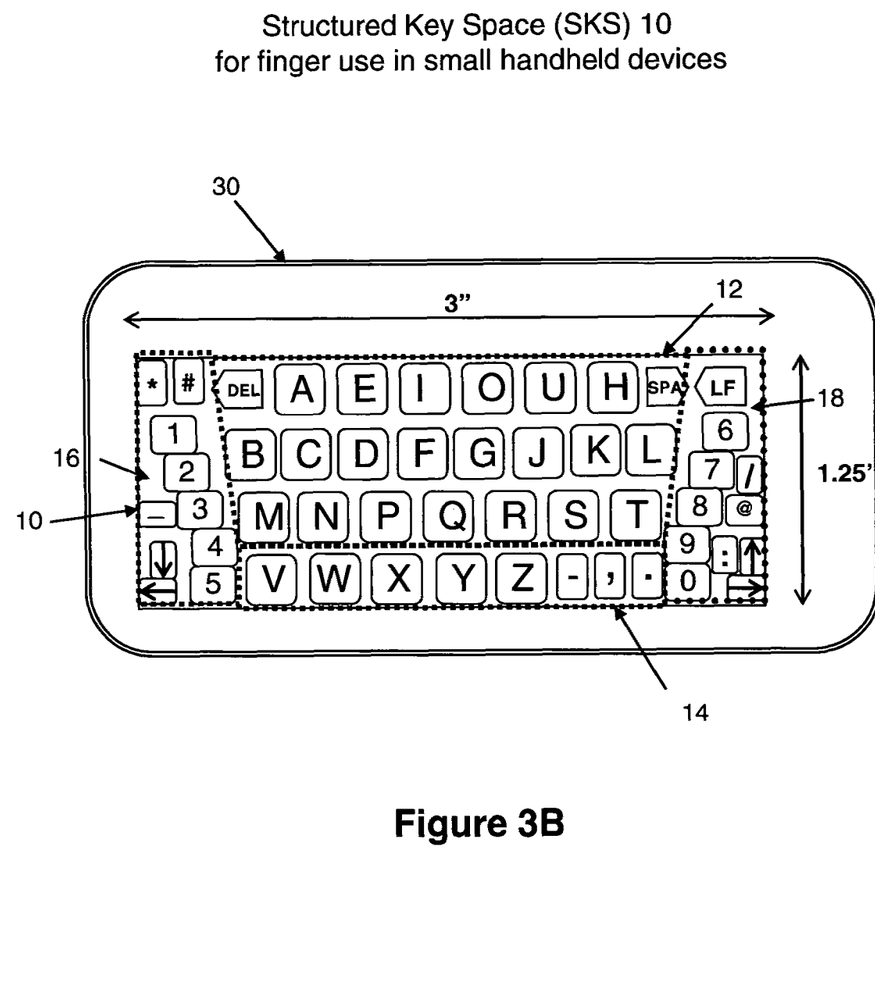

As shown in FIG. 3A, as a first step of the structured methodology, a limited set of keys from a full set of keys is selected that are pertinent and suitable for this mode of operation for entering limited text on these small handheld devices. A full set of keys is used to select the limited set of keys 20. These limited set of keys are selected for use in the limited key space 10 of the device 30, as shown in FIG. 3B.

Figure 5A:
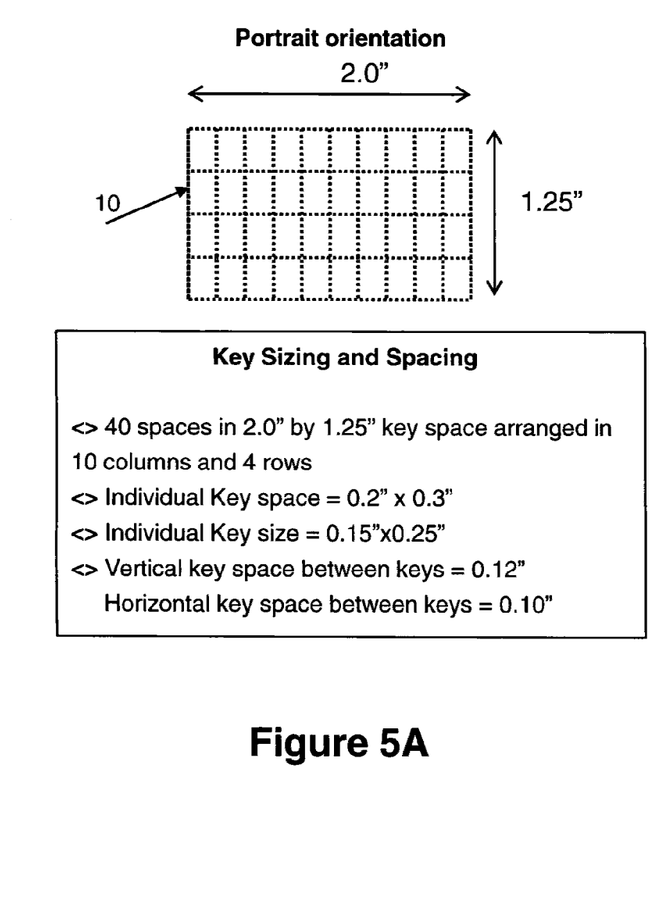
FIG. 5A-5B are block diagrams that illustrates features of the key space in the portrait and landscape orientations of the present embodiment of the invention.
Figure 5B:
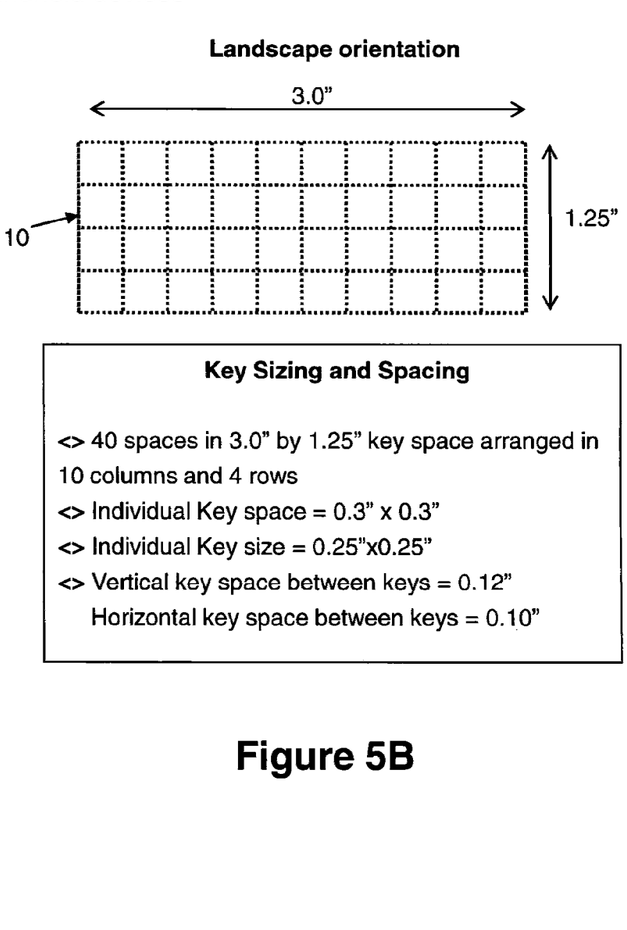

As shown in FIGS. 5A and 5B, the limited key space 10 is defined as 2"×1.25" for portrait orientation of the device and as 3"×1.25" for landscape orientation, each composed of 40 space cells in four rows and ten columns. These sizes are typical for the devices in common use today. As an illustration i-phone in the portrait orientation places ten of QWERTY keys in a single row, the topmost row of the key space. There are four rows of the QWERTY with the bottom row being used for a space bar. However the sizes of the devices may be different than these sizes and the same structured methodology is applicable to these sizes as well.

As shown in FIG. 3A, there are fifty-two such selected keys. These selected keys 20 are fifty-two and believed represent the set of keys which a user of a small handheld device may require to compose any type of text message responses and similar other operation. There could be less or a different set of keys, however these fifty-two specific keys are selected in the preferred embodiment.

These fifty-two keys include, the twenty six alphabets, ten numerals, six punctuation marks of dash, comma, a full stop, underscore, colon, and forward slash; three special keys of Space, Delete, LF; three function keys of pound sign, asterisk and, at-sign; and, four cursor control keys. That makes for a set of fifty-two keys. Many other keys have not been included in this set of fifty-two keys as they are believed not required for the mode and operation of use of the small handheld devices. As an illustration of some of the keys that are not included are six bracket keys and other punctuation keys.

As shown in FIG. 3A, these fifty-two limited set keys 20 are grouped into two functional groups of more-used keys 21 and less-used keys 22. There are twenty-three more-used keys 21 and twenty six less used keys 22. The more-used keys 21 are grouped into three groups of, vowels 21A, more-used consonants 21B, and keys of space and delete 21C. The less-used keys 22 are grouped into five groups of, less-used consonants 22A, numerals 22B, punctuation 22C, functions 22D and cursor control keys 22E. Thus there are eight hierarchical functional groups of keys. These eight groups are vowels, more used consonants, space and delete keys, less used consonants, punctuation, numerals, function keys and cursor keys.

Figure 4:
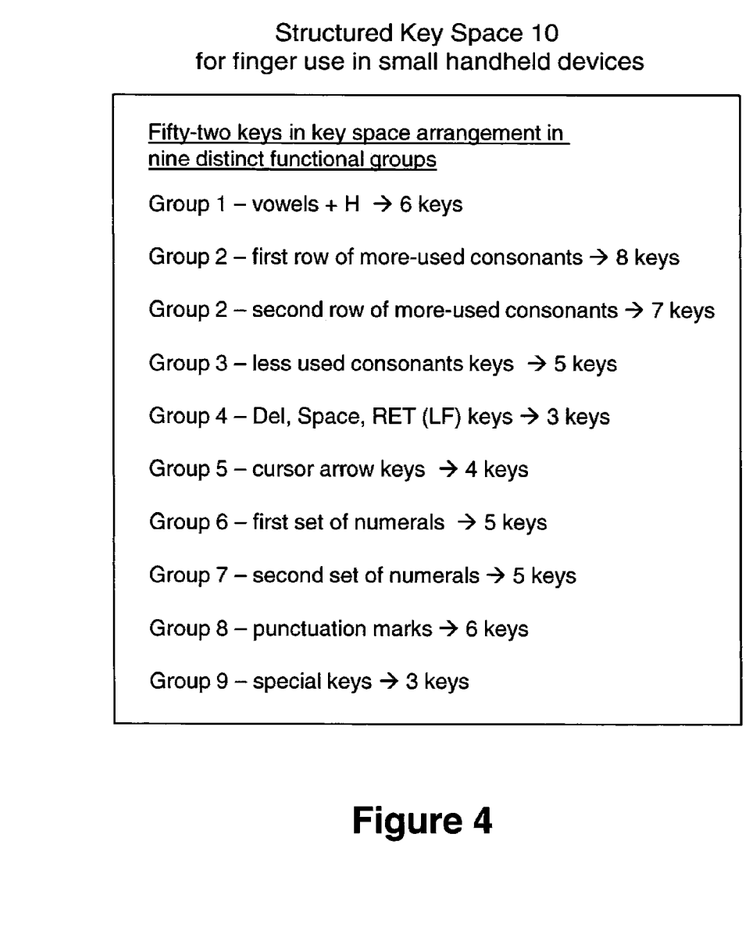
FIG. 4 are block diagram of the functions groups of keys for position them in the structured key space

As illustrated in FIG. 4, the keys in each of the functional groups are identified. The group of numerals is further grouped into two groups of lower and upper numerals, making for nine functional groups from the selected these fifty-two keys.

As shown in FIG. 3B, the key space 10 of a device is structured into four key spaces. These four key spaces are top-center space 12, bottom space 14, left space 16 and right space 18. The top-center space 12 may be visually separated from the other three spaces by a different background color. Alternatively the visual separation may be by different color of the keys themselves or the alphabets. The visual separation helps the user visually perceive these four different key spaces to be able to quickly select the space where the desired key is positioned.

There may be other or different such structure key spaces and are not ruled out. These nine key groups are mapped or positioned in to these four key spaces of the key space 10. As shown in FIG. 3B, the nine functional groups are positioned in these four key space areas.

As shown in FIG. 4, the keys themselves, fifty-two of them are grouped in nine different groups and these nine groups are laid out in these four structured spaces. That is these nine different structure groups that are laid out in four different space areas as illustrated in FIG. 3B.

From Wikipedia, the 'top twelve' letters comprise about 80% of the total usage. The "top eight" letters comprise about 65% of the total usage. Prior Art FIG. 1C identifies the frequency of usage of the alphabets As shown in FIG. 3B, the first row of the key space 12 has six letters. The frequency of use of these six letters is, A—8%, E—13%, I—7%, O—7.5%, U—3%, H—6% provides for a total of 44.5%. The second row provides for eight letters. Frequency of these eight letters is B—1.5%, C—3%, D—4%, F—2%, G—2%, J & K—1%, and L—4%, for a total of 17.5%. The third row provides for six letters. The frequency of these seven letters is M—2.5%, N—7%, P—2%, Q—2%, R—6%, S—6%, T—9%, for a total of 33.5%.

Hence the center space 12 provides 21 letters of the 26 alphabets for a total frequency of 95.5% of usage of these keys. Hence positioning these keys in the center space provides for the more-used keys 21.

Frequency of use is not a sole criterion for placing keys in this limited key space, but that mentally and visually these keys can be quickly and easily found on the limited key space 10. The keys are arranged in the key space based on their functional groups and their frequency of use for drafting short texts responses and messages. That is, the primary criterion for placing these keys is that they can be mentally and visually be found very quickly in the key space 10. The key space layout is referred to as structured key space (SKS).

As a simplified illustration of this mental-visual structured approach, if a person is typing "bye", for each letter, the user would mentally know where to find the letter in the key space. That mental knowledge helps the user to look for the "b" key in the beginning space of second row space, "y" key in the space of the bottom row and the "e" key in the topmost vowel row. As another simplified illustration, if a person is typing "love", the user would know to look for "L" in the middle rows, "V" in the bottom row, and "o" and "e" in the top vowel row.

If a person is typing a number, the user would mentally-visually go to the left or right space depending upon the number being five or less or greater than five. Hence keys for numerals 1 to 5 are in the left space and numerals 6 to 9 and zero in the right space.

The space and delete keys are likely to be of high usage and hence are positioned on the left and right of the vowel in the first row. The Line Feed (LF) also known as Return or RTN key is positioned on the top of the right space. So are the keys for pound and asterisk sign that are also positioned on the top space of the left space.

The three punctuation keys of dash, comma, and full stop are placed in the bottom row, next to the less-used consonants. The other punctuation keys of colon, forward slash and underscore are positioned either in the left or the right space. The @ key is placed in the middle of the right space and the cursor keys are split into two pairs and are placed at the bottom of the left and right spaces.

Hence the structured key space provides for quickly finding the keys that are needed for typing a given text. In the four rows the alphabet letters are arranged sequentially, so that higher sequence letters would be in lower row and lower sequence letter would be in the first row. Most people as children had learned and memorized their ABC as a sequence of twenty six letters and instinctively know which letters are near beginning of the sequence, which are somewhere in the middle and which are near the end of the sequence. They also know by heart the five vowels.

For when looking to type "c", as not a vowel and in the beginning of the sequence, the user mentally and visually would go to the left area of the top-center key space 12 to quickly find the key C. That would not be possible with the prior art QWERTY and their adaptation in the small devices. The prior art as shown in FIGS. 2A-B has chosen to place in the first row of the key space 10, ten QWERTY letters (Q W E R T Y U I O P), and the remainder in the lower two rows without a useful structure that is relevant to the user in the key spaces 10 of the small handheld devices that would enable a user to find the key easily and quickly.

As illustrated in FIG. 3B, the Structured Key Space (SKS) 10 is developed for use in limited space on a smart phone type device using a finger or a thumb for limited data and text entry. Keys are grouped in a pattern and arranged in the key space 10 for ease of use where keys used more often are on the top. Pattern of keys are in structures that are easy to use and all keys are in a single visual space, for use in touch as well as mechanical switch keys.

As illustrated in FIG. 3B, the vowel group is laid out in the first row of the top-center key space 12. In this first row, along with the five vowels, a sixth key of H is included. Also the keys of Delete and Space function are positioned in the first row on either side of the groups of vowels. In the top-center space 12 there are also positioned a second and a third row of keys. These two rows of keys are for the more-used consonants.

Also as illustrated in FIG. 3B, the bottom space 14 has a single row and has the less-used consonants and punctuation keys. In this fourth row of the key space 10, the keys are V, W, X, Y and Z, and the punctuation keys of dash, coma and full stop.

Also as illustrated in FIG. 3B, the left space 16 has a set of keys arranged in this vertical oriented space. These keys are pound and asterisk on the top part and the first set of numerals 1 to 5 arranged vertically. At the bottom of the vertical left space are also positioned half of the cursor control keys.

Also as illustrated in FIG. 3B, the right space 18 has a set of keys arranged in this vertical oriented space. These keys are LF or RET on the top part and the second set of numerals 6 to 0 arranged vertically. At the bottom of the vertical right space are also positioned half of the cursor control keys, and the @ symbol key.

As illustrated in FIG. 5A, for a typical device, a space of two inch wide and 1.25's height may be available in a portrait orientation of the device for key space 10. As illustrated in FIG. 5B, for a typical device, a space of three inch wide and 1.25's height may be available in a landscape orientation of the device for the key space 10. Each of these key spaces 10 has forty cells in ten columns and four rows for placement of the keys.

As illustrated in FIG. 5A, these cells are sized at 0.2×0.3 inches and allows for an individual key size of 0.15×0.25 with inter key spacing of 0.12" vertically and 0.10" horizontally. These spaces are consistent with what has been used in prior art QWERTY small devices such as I phone.

As illustrated in FIG. 5B, these cells are sized at 0.3×0.3 inches and allows for an individual key size of 0.25×0.25 with inter key spacing of 0.12 vertically and 0.10 horizontally. These spaces are consistent with what has been used in prior art QWERTY small devices such as I phone.

Figure 6A:
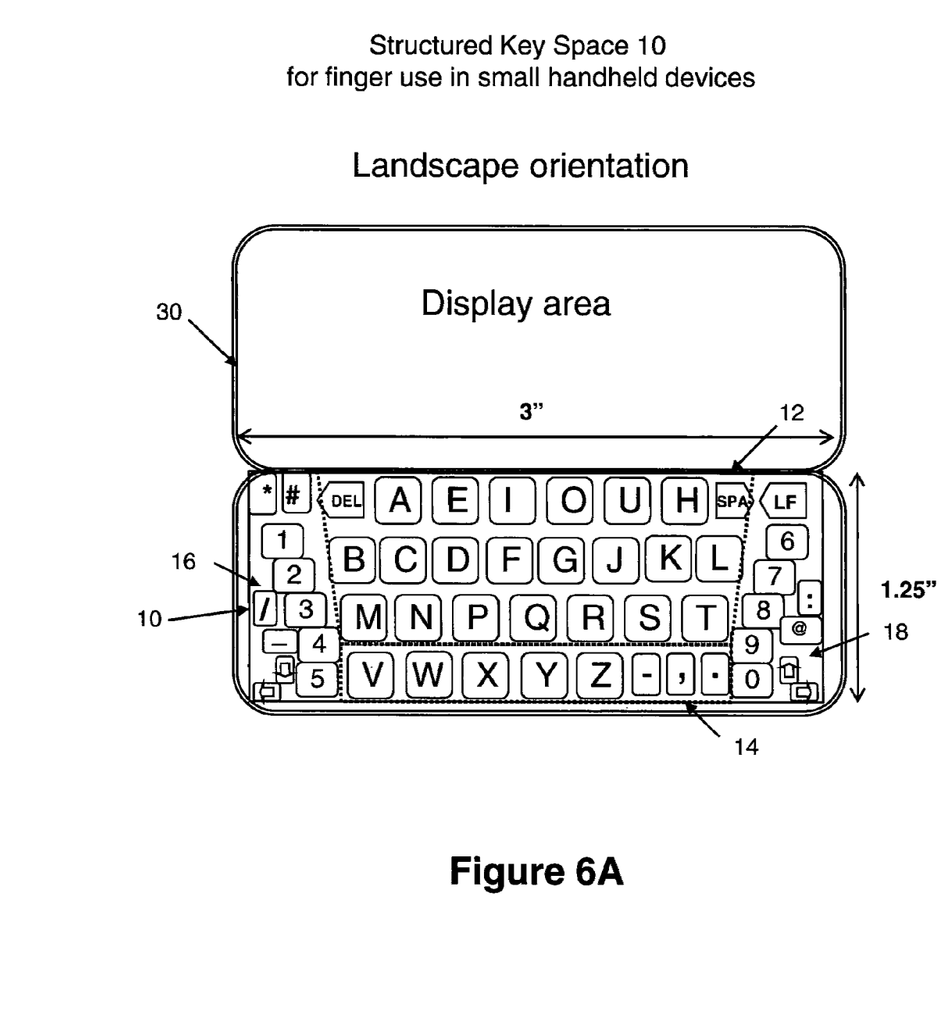
FIG. 6A-6B are diagrams that illustrates features of the present embodiments of the invention in actual devices.
Figure 6B:
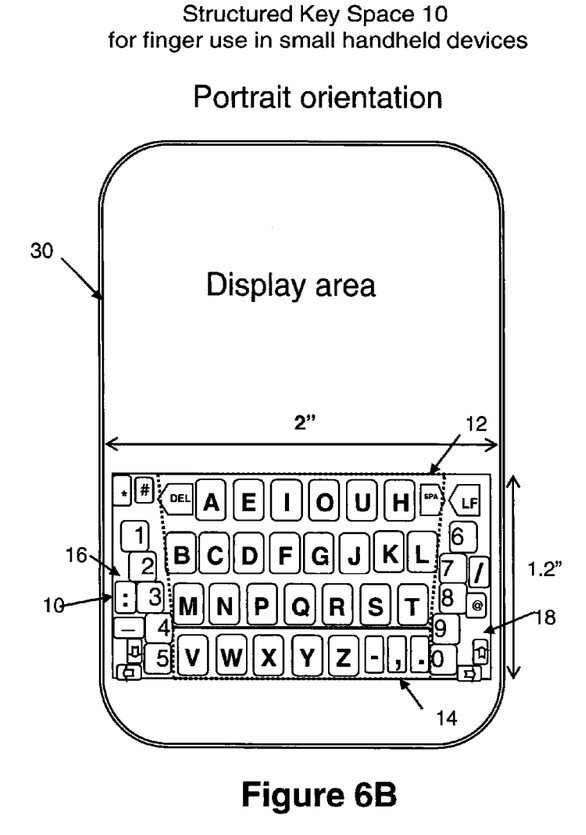

FIGS. 6A and 6B show simplified illustrations of the use of the limited set of keys 20 in the key space 10 of devices in portrait and landscape orientations.

A method for positioning keys in a limited keypad space in handheld computing and communication devices for efficient finger operation, partitions the keys in two groups of more-used and less-used keys. The more used keys are positioned in the top center area of the keypad space and the less-used keys in the remainder key space including a bottom, a left, and a right area of the key space.

The more-used keys include a set of keys for vowels, more-used consonants, a space, and a delete. The less-used keys include a set of keys for less-used consonants, numerals, punctuation marks, special keys, and cursor movement keys.

The more-used keys of, the keys of vowels, the space, and the delete are positioned on a top row of the top-center area and the most-used consonants on the lower rows. The less-used keys of, a set of keys for numerals, special keys, and cursor movement keys are positioned on the left and right area of the key space and less-used consonants and punctuation keys on the bottom area 14 of the key space 10.

The layout of the keys in the key space is adjusted based on the size and the orientation of the key space with a correspondingly adjusted key size. There is space for 40 keys; however, fifty-two keys are positioned in these forty spaces, by making the size of less-used keys smaller than other keys and using less space between these keys. That has been done in the three spaces, 14, 16 and 18 around the center space 12.

In the SKS, all the keys are not used as all of them are not required or used for this type of single finger or thumb driven typing operation on the small handheld devices. As illustrated in FIG. 3B, there are four structured spaces, referred to as a top center 12, a left space 16, a right space 18 and a bottom space 14. The method and system of that structure is described further with the help of FIGS. 7 and 8.

Figure 7:
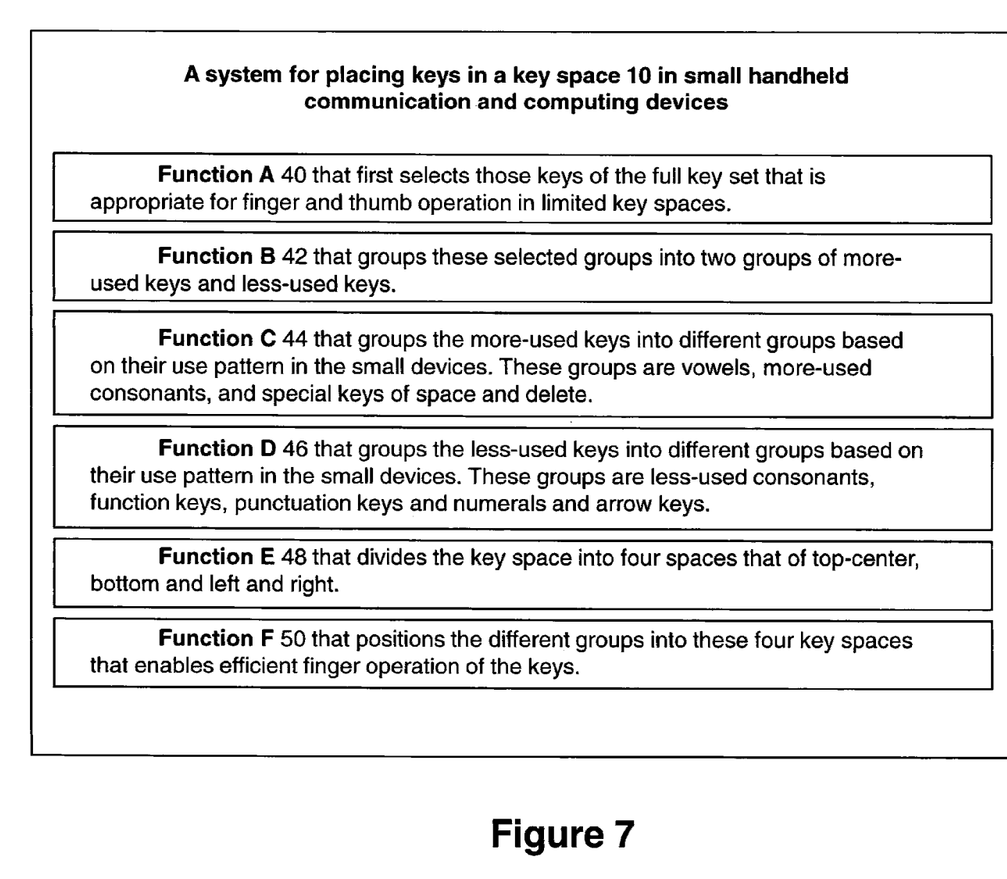
FIG. 7 is block diagram that illustrates features of the present embodiments of the invention in actual devices.

As illustrated in FIG. 7, the system has a function A 40 that first selects those keys of the full key set that is appropriate for finger and thumb operation in limited key spaces.

The system has a function B 42 that groups these selected groups into two groups of more-used keys and less-used keys.

The system has a function C 44 that groups the more-used keys into different groups based on their use pattern in the small devices. These groups are vowels, more-used consonants, and special keys of space and delete.

The system has a function D 46 that groups the less-used keys into different groups based on their use pattern in the small devices. These groups are less-used consonants, function keys, punctuation keys and numerals and arrow keys.

The system has a function E 48 that divides the key space 10 into four spaces that of, a top-center space 12, a bottom space 14, a left space 16, and a right space 18.

The system has a function F 50 that positions the different groups into these four key spaces that enables efficient finger operation of the keys.

A method for positioning keys in a limited key space in handheld computing and communication devices for efficient finger operation, has the steps of, where not all the steps may be used or used in the order specified:

a. selecting a limited set of keys from a full set of keys, where the selected limited set is useful for use in small handheld devices based on their mode of use and operation.

b. partitioning the selected keys in two groups of (i) more-used and (ii) less-used keys; and c. positioning the more-used keys in a top-center area of the key space and the less-used keys in a remainder key space area including a bottom, a left, and a right area of the key space.

c. including in the more-used keys a set of keys for vowels, more-used consonants, a space, and a delete.

d. including in the less-used keys a set of keys for less-used consonants, numerals, punctuation marks, special keys, and cursor movement keys.

e. positioning of the more-used keys, the keys of vowels, the space, and the delete on a top row of the top-center area and the most-used consonants on the lower rows.

f. positioning of the less-used keys, a set of keys for numerals, special keys, and cursor movement keys on the left and right area of the key space and less-used consonants and punctuation keys on the bottom are of the key space.

g. adjusting the layout of the keys in the key space based on an orientation of the key space with a correspondingly adjusted key size.

h. adjusting the layout of the keys in the key space based on the size of the key space with a correspondingly adjusted key size.

i. making the size of some keys larger than other keys and some keys smaller than other keys based on their usage and positioning in the key space.

Another method for positioning keys in a limited keypad space in handheld devices for efficient finger operation has the steps of:

a. creating key groups of vowels, more-used consonants, less-used consonants, numerals, punctuation, cursor movement, and special keys; and b. positioning the key groups in the different key spaces of a device that enable a user to look for the specific key from a groups in that key group space for efficient finger operation of the keys.

c. positioning the key groups of vowel, more-used consonants and special keys in the top center of the key space area; and d. positioning the less-used consonants, numerals, punctuation and cursor movement keys in the remainder keypad space including a bottom, a left, and a right area of the keypad space.

e. positioning of the more-used keys, the keys of vowels, the space, the LF and the delete on a top row of the top-center area and the most-used consonants on the lower rows.

f. positioning of the less-used keys, a set of keys for numerals, special keys, and cursor movement keys on the left and right area of the key space and less-used consonants and punctuation keys on the bottom are of the key space.

g. dividing the numeral key group into groups of lower and upper group and positioning the lower numeral group in a left space and the upper group in a right space of the key space.

Figure 8:
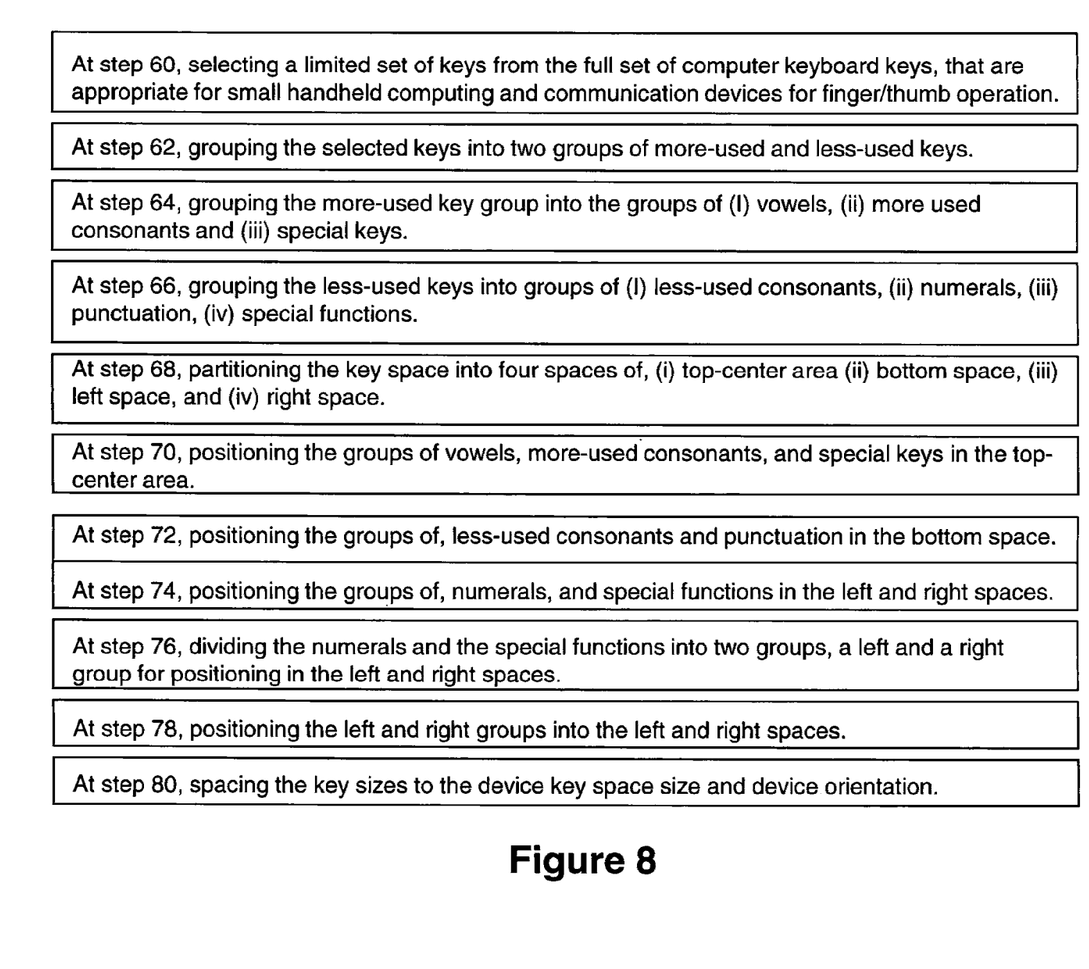
FIG. 8 is method diagram that illustrates features of the present embodiments of the invention in actual devices.

A method as shown in FIG. 8, for positioning keys in a limited key space has the following steps, where all the steps may not be used or used in the order specified.

At step 60, selecting a limited set of keys from the full set of computer keyboard keys that are appropriate for small handheld computing and communication devices for finger/thumb operation.

At step 62, grouping the selected keys into two groups of more-used and less-used keys.

At step 64, grouping the more-used key group into the groups of (I) vowels, (ii) more used consonants and (iii) special keys.

At step 66, grouping the less-used keys into groups of (I) less-used consonants, (ii) numerals, (iii) punctuation, (iv) special functions.

At step 68, partitioning the key space into four spaces of, (i) top-center area (ii) bottom space, (iii) left space, and (iv) right space.

At step 70, positioning the groups of vowels, more-used consonants, and special keys in the top-center area 12.

At step 72, positioning the groups of, less-used consonants and punctuation in the bottom space 14.

At step 74, positioning the groups of, numerals, and special functions in the left and right spaces 16 and 18.

At step 76, dividing the numerals and the special functions into two groups, a left and a right group for positioning in the left and right spaces.

At step 78, positioning the left and right groups into the left and right spaces.

At step 80, determining the key sizes and key spaces to the device key space size and device orientation.

In summary, the embodiments herein are on systems and methods that position keys in the limited key space of the small handheld computing and communication devices such as smart phones. In a preferred embodiment the keys are grouped into nine functional groups and the key space itself is partitioned into a four key space areas. These nine functional groups are positioned into these four key spaces for efficient finger and thumb operation.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. An apparatus, comprising:

a handheld mobile wireless device with, a limited screen size, a CPU, a storage memory, a user interface comprising a display with a touch screen, and a logic stored in the storage memory and operating in the CPU of the device, wherein:

the memory of the device stores fifty-two keys or less that have been preselected from a full qwerty set of keys, the memory stores the keys in groups of most-used keys and less-used keys based on their frequency of use;

the logic causes the display to display a contiguous key space in the display which has a top space, a bottom space and two side spaces and the logic positions the most-used keys in the top space and the less-used keys in the bottom space and the two side spaces;

the memory stores in the group of the most-used keys, groups of vowel keys, most-used consonant keys and special function keys including space and delete keys and the logic causes these keys to be displayed in the top space;

the memory stores in the group of the less-used keys, groups of, less-used consonant keys and remainder keys and the logic causes these keys to be displayed in the bottom space and the two side spaces; and wherein the logic causes the display to display keys from the group of most-used keys, the group of vowel keys, the space key and the delete key on a top row of the top space and the most used consonant keys on other rows of the top key space.

2. The apparatus of claim 1, wherein:

the remainder keys include numeral keys, punctuation keys, special keys and cursor control keys and displays these keys in the bottom space and the two side spaces.

3. The apparatus of claim 1, wherein:

the logic causes the display to display the group of less-used consonant keys in the bottom space.

4. The apparatus of claim 1, wherein:

the logic causes the display to display the groups of numeral keys, punctuation keys, special keys and cursor control keys in the two side spaces.

5. The apparatus of claim 1, comprising wherein:

the logic causes the display to display from the group of less-used keys, numeral keys, special keys, and cursor movement keys in the two side spaces and less-used consonant keys and punctuation keys in the bottom space.

6. The apparatus of claim 1, comprising wherein:

the logic causes the display to display the group of numeral keys into groups of a lower numeral group in a left space and an upper numeral group in a right space of the key space.

7. The apparatus of claim 1, wherein:

the logic causes the key space to be displayed by the display with the fifty-two keys or less in groups comprising a row of six keys including vowel keys and an H key a first row of a portion of the most-used consonants keys having 8 keys, a second row of another portion of the most-used consonant keys having seven keys;

the fifty-two keys or less further including five less-used consonant keys, four cursor arrow keys a first set of five numeral keys, a second set of five numeral keys, six punctuation mark keys, and three special keys.

8. A method, comprising the steps of:

providing a handheld mobile wireless device with, a limited screen size, a CPU, a storage memory, a user interface comprising a display with a touch screen, and a logic stored in the storage memory and operating in the CPU of the device;

storing in the memory of the device fifty-two keys or less that have been selected from a full qwerty set of keys, the keys stored in groups of most-used keys and less-used keys based on their frequency of use;

displaying a contiguous key space which has a top space, a bottom space and two side spaces and displaying the most-used keys in the top space and the less-used keys in the bottom space and the two side spaces;

wherein the most-used keys comprise vowel keys, most-used consonant keys and special function keys including space and delete keys and wherein the display displays these keys in the top space;

wherein the less-used keys comprise the less-used consonant keys and remainder keys and wherein the display displays these keys in the bottom space and the two side spaces; and wherein from the most-used keys, the vowel keys, the space key, and the delete key are displayed on a top row of the top space and the most-used consonant keys on other rows of the top space.

9. The method of claim 8, wherein:
the remainder keys include numeral keys, punctuation keys, special keys and cursor control keys.

10. The method of claim 8, wherein:
the less-used consonant keys are displayed in the bottom space.

11. The method of claim 8, wherein:
displaying the numeral keys, punctuation keys, special keys and cursor control keys are displayed in the two side spaces.

12. The method of claim 8, wherein:
from the less-used keys, numeral keys, special keys, and cursor movement keys are displayed on a left space and a right space of the two side spaces and less-used consonant keys and punctuation keys on the bottom space.

13. The method of claim 8, wherein:
the numeral keys are displayed into groups of a lower numeral group in the left space and an upper numeral group in the right space of the key space.

14. The method of claim 8, wherein:
the key space is displayed with the fifty-two keys or less in groups comprising a row of six keys including vowel keys and an H key, a first row of more-used consonant keys having 8 keys, a second row of more used consonants keys having seven keys;

the fifty-two keys or less further including five less-used consonant keys, four cursor arrow keys, a first set of five numeral keys having five keys, a second set of five numeral keys, six punctuation mark keys, and three special keys.

\* \* \* \* \*